3,647,610
Patented Mar. 7, 1972

1

3,647,610
PRESERVATION OF AQUEOUS DISPERSIONS WITH BROMOCYANOACETAMIDES
Paul A. Wolf, Midland, Mich., assignor to The Dow Chemical Company, Midland, Mich.
No Drawing. Continuation-in-part of application Ser. No. 650,264, June 30, 1967. This application July 31, 1970, Ser. No. 60,095
Int. Cl. D21h 5/22
U.S. Cl. 162—161                           19 Claims

ABSTRACT OF THE DISCLOSURE

A method useful for preserving aqueous dispersions of biodegradable cellulosic matter such as wood pulp suspensions from microbial attack comprises adding to the dispersion an antimicrobial amount of a bromocyanoacetamide compound such as 2,2-dibromo-2-cyanoacetamide. In a preferred embodiment, the method comprises the further step of treating the dispersion to which the bromocyanoacetamide compound has been added with sufficient of a base to inactivate such compound prior to discharging any of the dispersion into the environment.

CROSS-REFERENCE TO RELATED APPLICATION

This is a continuation-in-part of my co-pending application, Ser. No. 650,264, filed June 30, 1967 and now abandoned.

BACKGROUND OF THE INVENTION

Aqueous mixtures containing biodegradable cellulosic matter such as aqueous wood pulp and paper pulp dispersions employed in paper making, cooling pond water contaminated with organic cellulosic debris, and the like are characteristically subject to microbial attack in the absence of an effective germicide. Microbial attack by either bacteria or fungi, or both, causes the loss of useful properties, foul odors, slime formation, slime spots in paper, reduced strength of paper, production down-time, and the possibility of skin infections in persons handling these materials. Many of such dispersions also contain mineral salts, proteins, lignins and the like in addition to cellulosic matter, and are particularly difficult to protect with antimicrobials due to inactivation of many antimicrobials in such systems. The control of slime-forming microorganisms in many such systems is made more difficult in circulating systems in which there is a more or less continuous inoculation of the circulating dispersions with microorganisms with the addition of aqueous feed, and in recycling systems in which the aqueous dispersion in use can be recontaminated by recycled water. The aqueous dispersions of cellulosic matter employed in paper production present a problem of great magnitude. In addition to the more or less continuous inoculation of the aqueous paper pulp dispersions, such dispersions are frequently at an acid pH, and contain oxidizing agents such as sulfites, which can have a detrimental effect on the operation of many antimicrobial materials. The difficulties inherent in obtaining a useful antimicrobial for aqueous cellulosic dispersions in general and paper pulp dispersions in particular are discussed, for example, in U.S. Pats. Nos. 3,065,123 and 2,873,249.

A further problem is presented in many aqueous systems when a portion of the aqueous dispersion is discharged into the environment. The aqueous effluent should not be detrimental to environment when discharged into streams, rivers or lakes. In some paper mill systems, microbiological treatments such as activated sludge or trickling towers have been employed to treat aqueous effluents. However, in many cases the same slimicides which are useful in protecting the aqueous dispersion have been found to be detrimental to desirable organisms in the environment when discharged in a paper mill effluent, and in some cases the slimicides have been found to act against the microorganisms employed in waste water treatment, rendering such facilities less effective. It would therefore be desirable to provide a method for controlling slime forming microorganisms in aqueous systems which will alleviate the problems created by discharge of an effluent from the system.

The present invention relates to the use of certain bromocyanoacetamides described by Nolan et al. in U.S. Pat. No. 2,419,888 and taught therein to be useful in non-aqueous systems for the control of fungal attack on seed grain. Halocyanoacetamides are also described in German Pat. No. 1,218,661, and U.S. Pat. No. 3,493,-658, to Schmidt et al.; in Belgian Pat. No. 668,336 to Ciba S.A.; and in U.S. Pat. No. 3,403,174. Other haloacetamides are known to be useful for the control of certain bacterial and fungal organisms, U.S. Pat. 3,206,-509, and for the preservation of water emulsion paints.

BRIEF SUMMARY OF THE INVENTION

It has now been found that the bromocyanoacetamide compounds 2 - bromo - 2 - cyanoacetamide, 2 - bromo-2-chloro - 2 - cyanoacetamide, 2,2 - dibromo - 2 - cyanoacetamide and their N-methyl substituted derivatives are particularly effective germicides and slimicides when present in aqueous dispersions containing biodegradable cellulosic matter in an antimicrobial amount. Such compounds correspond to the formula

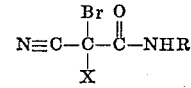

wherein X represents chloro, bromo or hydrogen and R represents methyl or hydrogen. The compounds all include a 2 - bromo substituent and a 2 - cyano substituent and are conveniently preferred to generically as "bromocyanoacetamides" or "bromocyanoacetamide compounds." The addition of an antimicrobial amount of such a bromoacetamide compound to aqueous dispersions of cellulosic matter has been found to provide excellent and rapid control of microorganisms, including slime-forming microorganisms, Gram-negative and Gram-positive bacteria, filamentous fungi and yeasts. By the use of such compounds, excellent control of microorganisms can be obtained in aqueous cellulosic media in the presence of other organic matter such as proteins, surfactants, starch and lignins and under oxidizing conditions of aeration or the presence of sulfites, over a wide variety of pH ranges, and at optimum temperatures (about 20° to about 45° C.) for growth of microorganisms in such media. They are active against a wide spectrum of bacteria and fungi even when such organisms are simultaneously present as in a mixed population of bacteria, yeasts and fungi. The bromocyanoacetamide compounds are highly active in aqueous dispersions of cellulosic matter having an acid pH on the order of from about 4 to about 6.0. They are particularly effective at a pH of from about 4 to about 6 to 7 in aqueous cellulosic pulp dispersions such as those employed in paper making, and are stable under such conditions for several days, providing persistent protection from repeated recontamination. The bromocyanoacetamides have been found to compare favorably with many known and widely used slimicides in such properties as antimicrobial activity, solubility, foaming, effect on paper making equipment and paper produced, color, odor, handling safety, etc. They are relatively non-hazardous to higher animals in relation to conditions of use. For example, 2,2 - dibromo - 2 - cyanoacetamide has an oral acute LD 50 of 235 milligrams per kilogram in rats.

The compounds have been found to be particularly useful as paper mill slimicides not only by virtue of their high antimicrobial activity, rapid action, dispersibility in water, and desirable persistence in paper pulp dispersions under the conditions of use, but also by virtue of their lack of affinity for the cellulosic materials employed in such systems. The compounds are particularly effective against organisms involved in the formation of slime in paper mill systems and including *Aerobacter aerogenes, Bacillus subtilis, Penicillium chrysogenum, Aspergillus terreus* and *Candida pelliculosa.* They are particularly advantageous in such applications since they have no substantial adverse effects on either the paper-making equipment or the quality of the paper produced.

The method of the invention in a further embodiment thereof can be employed to control undesirable microorganisms in an aqueous system during the use thereof, without detrimentally affecting desirable organisms when the aqueous dispersion containing the bromocyanoacetamide is discharged to the environment or to a microbiological water treatment facility such as a trickling tower or activated sludge facility. In such further embodiment, an antimicrobial amount of the bromocyanoacetamide compound is added to an aqueous dispersion having a pH of 3.5 to 7, thus protecting the dispersion from a first population of undesirable bacteria and fungi and the dispersion is thereafter treated by the addition of a base to raise the pH to a pH above 8 for a time sufficient to obtain a substantial reduction in the antimicrobial activity of the dispersion prior to exposing a second population of desirable organisms to the dispersion. Such treatment of the dispersion can be carried out, for example, before discharging an effluent dispersion into a stream, river or lake or before inoculating the effluent with desirable microorganisms as may be desired when the effluent is to be treated in a waste water treatment facility.

The bromocyanoacetamide compounds degrade readily in aqueous solution at a pH of 8 to 14 to form products which are relatively non-hazardous, which have little or no antimicrobial activity and little or no detrimental effects upon other organisms such as bacteria, fungi, fish, algae or the like. The compounds are extremely rapid in antimicrobial action, even at a basic pH. For example, 2,2 - dibromo - 2 - cyanoacetamide has sufficiently rapid activity at pH 8 to kill or inhibit many bacteria and fungi before decomposing to less than an antimicrobial amount. Consequently, it is critical for the successful practice of this embodiment of the invention that the aqueous dispersions containing an antimicrobial amount of the bromocyanoacetamide compound be held at a sufficiently high pH for a sufficient period of time to render the dispersion safe for exposure to the desirable organisms. In general, the time should be sufficient for the concentration of the bromocyanoacetamide to decrease to less than an antimicrobial amount. The exact combination of pH and holding time to be employed depends on a variety of factors such as the concentration of the particular bromocyanoacetamide in the aqueous dispersion, the holding temperature, the nature of the second population of organisms, exposure to ultraviolet irradiation, whether or not the dispersion is to be further diluted prior to contact with desirable organisms or the like. In general, pH and holding time can be somewhat less for 2-bromo-2-cyanoacetamide dispersions, other conditions being similar, however, it is preferred to employ similar treatments in all cases.

DETAILED DESCRIPTION OF THE PREFERRED EMBODIMENTS

In the practice of the invention, sufficient of one or more bromocyanoacetamide compound is added to an aqueous dispersion containing biodegradable cellulosic matter to provide an antimicrobial amount of the bromocyanoacetamide. The active bromocyanoacetamide compound can be added continuously to a flowing aqueous dispersion such as a wood pulp suspension in paper mill systems, to provide a continuous antimicrobial concentration of the toxicant compound in the aqueous dispersion. The compounds can also be added to flowing dispersions intermittently at high local concentrations to maintain an antimicrobial amount of the active bromocyanoacetamide in the overall dispersion at all times. The cellulosic matter in the dispersion can include hardwood or softwood fiber, bleached or unbleached fiber, sulfite fiber or deinked and repulped paper fibers, and the like, such as are present in paper mill stock, typically in amounts of from about 0.1 to about 5 percent by weight, and the dispersion can also include starch, proteins, lignins, sulfites and other inorganic salts. The cellulosic matter in the dispersion can also include cellulosic organic debris such as dead or decaying leaves and grass clippings, dead bacteria, fungi, or algae and dead or decaying water plants or their remains such as are typically introduced into flowing aqueous systems in inlet or make-up water taken from rivers or lakes, or which may be present in cooling pond water. The aqueous dispersion can be a flowing aqueous dispersion having an inlet and an effluent, and a zone intermediate the inlet and outlet in which the water is used, for example in paper-making, and in which microbial growth is undesirable, and such a dispersion can also be recycled as when a portion of the effluent dispersion is returned to the intermediate zone for re-use. Such aqueous dispersions are typically recontaminated with a first population of bacterial and fungal slime-forming microorganisms, introduced in the inlet or make-up water, and are subsequently contacted with desirable microbial populations when they are discharged.

The antimicrobial amount of a bromocyanoacetamide compound to be employed in the practice of the present invention depends on a variety of factors such as the desired degree of preservation, whether inhibition of microbial growth or complete kill of microorganisms is desired, the rate of re-contamination of flowing dispersions, whether or not the dispersion is re-cycled, exposure time of the organisms to the toxicant compound, pH and temperature of the aqueous dispersion, the amount and type of biodegradable cellulosic matter in the dispersion and the particular bromocyanoacetamide compound employed. The compounds can generally be employed at lower antimicrobial amounts in water systems which are substantially free of metallic mercury, water soluble sulfides such as hydrogen sulfide, lower aldehydes such as formaldehyde and acetaldehyde, thiosulfate ions and xanthate ions, and are preferably employed in aqueous dispersions such as paper mill stock or cooling ponds, which generally contain less than one part per million of such materials.

Generally, excellent controls and complete kills of slime-forming organisms in aqueous dispersions containing biodegradable cellulosic matter is obtained when sufficient of a bromocyanoacetamide is added to the dispersion to provide the toxicant compound at a concentration of 5 to 25 parts per million by weight and the aqueous dispersion and microorganisms are exposed to the compound for 3 to 48 hours.

In flowing aqueous dispersions such as paper mill stock water excellent control of slime can be obtained by providing an antimicrobial concentration of from about 0.5 to about 1, to about 10 to about 50 parts by weight of bromocyanoacetamide compound per million parts of dispersion, and transient local concentrations can be considerably higher, such as from about 50 to 500 parts per million in aqueous dispersions such as broke, tank water, recycled water or when the toxicant compound is added intermittently to the flowing dispersion. However, a continuous concentration of more than 100 parts per million is generally not required for preservation of most such aqueous dispersions. In a preferred procedure, 2,2-dibromo-2-cyanoacetamide is added to a flowing aqueous dispersion contaminated with a mixed population of slime-forming microorganisms in an amount sufficient to provide an antimicrobial concentration of the compound of from about 0.5 to about 10 parts per million.

The active bromocyanoacetamide can be added to flowing aqueous dispersions at any convenient location in the stream. For example, when the dispersion is paper mill stock, the bromocyanoacetamide compound can be added at the headbox, stock chest, backwater tanks, savealls or at other convenient locations in the paper-making process. In recycling aqueous dispersions it can be added to the recycled water or to inlet or make-up water as desired. The compounds can be added directly to the dispersions or they can be formulated as water-dispersible compositions adapted to be added to water. For example, the bromocyanoacetamides can be formulated with one or more wetting agents such as sulfonated alkylbenzenes, alkylated aryl polyether alcohols, alkali metal salts of alkylaryl sulfonates, condensation products of mercaptans with ethylene oxide and sorbitan monolaurate polyoxyethylene derivatives and the like. Compositions can also include inert solid carriers such as talc, clay and kieselguhr. In a preferred composition, the compound is formulated with a straight chain liquid polyalkylene glycol such as polyethylene glycol 200.

When the aqueous dispersion having a pH of 3.5 to about 7 is treated with an antimicrobial amount of the bromocyanoacetamide compound and is thereafter to be inoculated with or otherwise exposed to desirable microorganisms, the practice of the invention further comprises the steps of adding sufficient base thereto to provide a pH of at least 8 in the dispersion and holding the dispersion at such pH until the dispersion contains less than an antimicrobial amount of the bromocyanoacetamide. The exact base to be employed is not critical, and in general any relatively non-toxic, water soluble base can be employed, such as ammonia, ammonium hydroxide, sodium hydroxide, sodiu carbonate, sodium bicarbonate, potassium hydroxide or the like. The amount of base employed can be varied, provided the pH is raised to the above-stated level. The holding time can be decreased at higher water temperatures such as 30° to 45° C. However, the holding time can be relatively brief (about 12 hours or less) over the optimum temperature range for growth of most microorganisms (about 20° to about 45° C.) which temperatures are also prevalent in most paper mills in which slime formation is a serious problem. The invention thus provides a rapid and inexpensive method for preserving aqueous systems while protecting against the discharge of noxious effluents from such systems.

The addition of base and holding can be carried out on a moving effluent stream, for example, by adding alkali metal hydroxide to an effluent stream, and directing the stream through a holding tank or pond or a series of holding ponds before introducing the effluent into a desirable microbiological population. Also, dispersions can be treated on a discontinuous basis, for example, in periodic shut-downs of re-cycling closed systems in which all the water in the closed system is periodically discharged. In either case, sufficient base is employed to provide a pH of from about 8 to about 14 in the aqueous dispersion. A pH of from about 8 to about 11 can be conveniently employed, and a pH of from about 8.5 to about 9.5 is preferred. Whether or not the resulting basic dispersion has been held until the concentration of bromocyanoacetamide has decreased to below an antimicrobial amount can be determined by conventional procedures for determining the antimicrobial activity of the treated dispersion against the organisms to be affected, for example, by determining the effect of the dispersion on microbial respiration in a Warburg flask or the like. Alternately, the concentration of the antimicrobial compound can be monitored by chemical analyses. The exact concentration to be obtained after treatment of the aqueous effluent can vary depending upon such factors as sensitivity of the particular organisms involved, temperature, pH of the dispersion at the time of exposure, and the like. In general, a final concentration of from zero to 250 parts or less of bromocyanoacetamide compound per billion parts of treated dispersion will have little or no detrimental effect on most organisms subjected thereto.

In a particularly useful embodiment, a bromocyanoacetamide compound is added to an aqueous dispersion of cellulosic matter contaminated with slime-forming micro-organisms and having a pH of from about 4 to about 7 to provide an antimicrobial concentration of the compound sufficient to prevent slime formation but less than an antimicrobial concentration sufficient to provide sterility in the dispersion within one to three hours of exposure. The concentration of the bromocyanoacetamide compound is thereafter maintained at a concentration sufficient to prevent slime formation but insufficient to sterilize during the desired time period in which the dispersion is to be used, or exposed to undesirable microbial populations, (for example, in paper-making, cooling or the like). The dispersion is thereafter mixed with sufficient base to raise the pH thereof to a pH of from 8 to about 11 and then held for a time at least sufficient for the concentration of bromocyanoacetamide compound to decrease below an antimicrobial amount prior to discharge either to the environment or preferably to a desirable microbial population in a waste water treatment facility. In such procedure, it is preferred that the bromocyanoacetamide compound be added to the dispersion as the sole essential slimicide employed, and it is further preferred to employ 2,2-dibromo-2-cyanoacetamide for such use. The presence of other organic antimicrobial agents such as chlorophenates, methylenebisthiocyanate, organic mercurials and the like is generally not necessary in controlling undesirable microorganisms and is not generally desirable when the dispersion is to be exposed subsequnetly to desirable organisms. Inorganic agents such as chlorine do not have a detrimental effect on the activity of the compound, and may be present in minor amounts, (usually 1 part per million or less) in portions of the dispersion. In many flowing dispersions residual chlorine may be present at least near the inlets, but the amounts thereof are generally insufficient to control slime-formation. In such preferred procedure excellent control of undesirable microbial populations can be obtained with excellent protection of desirable organisms upon subsequent exposure with antimicrobial amounts of from about 0.5 to about 10 parts per million of 2,2-dibromo-2-cyanoacetamide and holding times of from about 10 minutes to about 12 hours at a pH of from about 11 to about 8. A holding time of from about 30 minutes to about 12 hours at a pH of 8 to 9 and a temperature of 20° C. to 45° C. can be particularly useful.

The following examples illustrate the present invention but are not to be construed as limiting the same.

EXAMPLE 1

Fresh headbox stock was withdrawn from the headbox of a paper mill in a sterile container. The stock was a breadwrap furnish consisting of equal amounts of softwood and hardwood bleached kraft fiber. The aqueous dispersion contained 0.72 percent solids at a pH of 4.3 and a temperature of 40° C. 99 milliliters of the headbox stock was placed in a sterile flask and the flask was placed on a shaker in an incubator set at 40° C. An acetone solution of 2-bromo-2-cyanoacetamide was added to the headbox stock in an amount sufficient to provide the toxicant compound at a concentration of 250 parts per million. A second sterile flask containing 99 milliliters of the headbox stock was similarly incubated to serve as a check, but the check flask did not contain any 2-bromo-2-cyanoacetamide. After three hours' incubation and after 24 hours' incubation, one milliliter aliquots were withdrawn from each of the test flask and the check flask. The samples were separately diluted in 9 milliliters of sterile water and one milliliter of the diluted stock was distributed over the surface of a tryptone glucose extract agar plate. The plates were incubated at 34° C. for 48 hours after which they were examined and bacteria counts were made. In the plates prepared after three hours' incubation, the flask containing 250 parts per million of 2-bromo-2-cyanoacetamide was found to have a bacteria count of about 80 cells per milliliter while the check flask had a bacteria count from about 760,000 to 1,000,000 cells per milliliter. In the plates made after 24 hours' incubation, the flask containing 250 parts per million of 2-bromo-2-cyanoacetamide was found to have less than 10,000 cells per milliliter while the check flask was found to have a bacteria count of from 9 to 11 million cells per milliliter.

EXAMPLE 2

Fresh headbox stock was withdrawn from the headbox of a paper mill in a sterile container. This headbox stock was withdrawn at a temperature of 30° C. and had a pH of 4.3. The stock contained 0.75 percent solids consisting of 30 percent bleached sulfite fiber and 70 percent of deinked repulped catalog and directory fiber. The headbox stock was distributed in 99 milliliter aliquots in sterile flasks which were then placed on gyratory shakers in an incubator at 30° C. An acetone solution of bromocyanoacetamide was added to one of the flasks in an amount sufficient to provide the toxicant compound at a concentration of 50 parts per million. An acetone solution of 2-bromo-2-cyanoacetamide was added to a second flask in an amount sufficient to provide the toxicant compound at a concentration of 100 parts per million. Check flasks were similarly prepared but did not contain any 2-bromo-2-cyanoacetamide. The flasks were incubated for three hours after which one milliliter aliquots were withdrawn and plates were prepared and bacteria counts made as described in Example 1. The stock in the flask containing 50 parts per million of 2-bromo-2-cyanoacetamide was found to have a bacteria count of 5,700 cells per milliliter. In the flask containing 100 parts per million per 2-bromo-2-cyanoacetamide, the bacteria count was found to be less than 1,000 cells per milliliter. The check flasks had a bacteria count from 780,000 to 940,000 cells per milliliter.

EXAMPLE 3

A mixed inoculum including bacteria and fungi involved in the formation of slime in paper mill aqueous systems was prepared. The inoculum contained 1.0 milliliter of a 24 hour culture of *Aerobacter aerogenes*, 10.0 milliliters of a 72 hour culture of *Bacillus subbtilis*, 10.0 milliliters of an aqueous 0.85 percent sodium chloride suspension containing spores harvested from a mature agar slant of *Penicillium chrysogenum*, 10.0 milliliters of a similar suspension of spores harvested from a mature agar slant of *Aspergillus terreus* and 10.0 milliliters of a similar suspension of spores harvested from a mature agar slant of *Candida pelliculosa*. An aqueous dispersion of biodegradable cellulosic matter was prepared by suspending ground wood pulp in water at pH 5.0 to provide 0.5 percent by weight of wood pulp in the suspension. The pulp system as provided was representative of many paper mill systems. Several separate flasks were prepared each containing 100 milliliters of the aqueous wood pulp dispersion and the dispersions were sterilized. To two of the flasks was added sufficient 2-bromo-2-cyanoacetamide to provide the toxicant compound at a concentration of 25 parts by weight of toxicant per million parts by weight of aqueous dispersion. 2,2-dibromo-2-cyanoacetamide was added to the aqueous dispersion in a separate pair of flasks to provide the toxicant compound at a concentration of 25 parts per million. 2,2-dichloro-2-cyanoacetamide was added to the aqueous dispersion in the remaining two flasks to provide the dichlorocyanoacetamide compound at a concentration equivalent to 100 parts per million to serve as a comparison. Other flasks were left untreated to serve as checks. All the flasks were then inoculated by the addition of 1.0 milliliter of inoculum prepared as described above. The flasks were incubated and after 24 and 48 hours, a smear was made on malt yeast agar and on bacterial nutrient agar from each flask. The smears were incubated for 48 hours and visually examined to ascertain the extent of bacterial and fungal growth. The agar smears made from the check flasks and from the flasks containing 100 parts per million of 2,2-dichloro-2-cyanoacetamide were found to support luxurient growth of both bacteria and fungi while the smears obtained from the aqueous dispersions containing 2-bromo-2-cyanoacetamide and 2,2-dibromo-2-cyanoacetamide were found to have no bacterial growth an no fungal growth.

In a similar operation, substantially complete or complete kills and controls of mixed populations of slime-forming bacteria and fungi were obtained when such organisms were exposed for 24 hours to one of 2,2-dibromo-2 - cyanoacetamide, 2,2 - dibromo-2-cyano-N-methylacetamide and 2-bromo-2-chloro-2-cyanoacetamide at a concentration of 10 parts per million.

EXAMPLE 4

In a procedure similar to that described above in Examples 1 and 2, paper mill stock contaminated with bacterial and fungal slime forming microorganisms (at least about one thousand organisms per milliliter) were withdrawn at a total of five (1, 2, 3, 4, 5) stations in two paper mills (A, B) in sterile containers and mixed with 2, 2-dibromo-2- cyanoacetamide to provide various concentrations of such compound in a series of flasks. The samples from mill A were examined for sterility after 0.5, 2 and 20 hours' exposure to 5 or 10 parts per million (p.p.m.) of the compound. Those from mill B were evaluated after 0.5 and 20 hours' exposure to concentrations of 10 and 50 p.p.m. The results obtained are set out in the following table:

| Station | Mill | pH | Dispersion | Concentration (p.p.m) providing sterility after— | | |
|---|---|---|---|---|---|---|
| | | | | 0.5 hrs. | 2 hrs. | 20 hrs |
| 1 | A | 4.9 | White water | >10 | 10 | |
| 2 | A | 6.6 | Wet lap stock | >10 | 10 | 10 |
| 3 | B | 6.8 | White water makeup | 50 | | 50 |
| 4 | B | 4.5 | Gray water | >50 | | 50 |
| 5 | B | 6.0 | Headbox stock | <10 | | 50 |

EXAMPLE 5

In a procedure similar to that described above in Example 1, 2 and 4, 2,2-dibromo-2-cyanoacetamide was added to an aqueous dispersion employed in a recycling cooling water system which included a cooling tower and a pond holding about 270,000 gallons of water. River water was added to the system at a rate of about 25 gallons per minute, providing substantially continuous contamination with micro-organisms (about 500 organisms per milliliter at the pond inlet) and cellulosic matter in the form of organic debris. In such operations samples of the pond water were exposed to 2,2-dibromo-2-cyanoacetamide at a concentration of 100 parts per million for one and three hours, after which time the samples were found to be sterile. Samples of water taken from the cooling tower were found to have microorganism counts of 30 and 20, respectively, organisms per milliliter after 20 minutes exposure to 2,2-dibromo-2-cyanoacetamide at concentrations of 50 and 100 parts per million. Untreated cooling tower water was found to contain about 12,500 organisms per milliliter.

EXAMPLE 6

In other operations, excellent control of the growth of slime forming microorganisms is obtained when 2,2-dibromo-2-cyanoacetamide or 2-bromo-2-cyanoacetamide is added to aqueous dispersions containing cellulosic matter and lignins (wood pulp) and a mixed population of bacterial and fungal organisms at concentrations of five to ten parts per million, at various pH's from about 4 to 6, and at temperatures of from about 20° to 30° C. Inhibition of microbial growth as indicated by Warburg flask determinations and reduced organism counts is generally obtained in from 0.5 to three hours' exposure, with complete kills and controls being observed in most cases after about 10 to 24 hours' exposure. Portions of the dispersions thus treated are then further treated by the addition of sodium hydroxide to provide final pH values of 8, 8.9, 9.7 and 11.3 and the mixtures are held at ambient temperatures (20°–25° C.). Aliquot portions of the treated dispersions are inoculated with a mixed inoculum characteristics of many trickling tower systems at various times after the addition of the sodium hydroxide and the reinoculated aliquots are incubated and observed for microbial growth. The results indicate that the dispersions initially treated with 5 parts per million of a bromocyanoacetamide compound have little or no residual antimicrobial activity against such organisms when held for about 10, 2, 0.75 and 0.25 hours, respectively at pH's of 8, 8.9, 9.7 and 11.3, respectively. The dispersions which initially contain 10 parts per million of said compound are found to have little or no activity against such organisms after corresponding holding times of about 12, 2.5, 1, and 0.5 hours, respectively. In contrast, portions of the dispersions to which no sodium hydroxide or other base is added are found to retain a high degree of antimicrobial activity for several days.

EXAMPLE 7

2,2-dibromo-2-cyanoacetamide is made up in two solutions, A and B, each containing one percent by weight of the compound. Solution A is aqueous sodium hydroxide having a pH of 9, while solution B is in distilled water at a pH of 7. Both solutions are held overnight at room temperature, then diluted with raw filtered lake water to provide two series of dilutions containing 1, 5, 10 and 100 parts of 2,2-dibromo-2-cyanoacetamide per million parts of dilution (based on initial concentration in solutions A and B). Five fathead minnows are exposed in each dilution for two days. All the minnows exposed to dilutions of solution A are alive and normal in appearance and activity, while the minnows exposed to solution B at the 5, 10 and 100 parts per million dilutions are observed to die during the test period, the minnows exposed to the one part per million dilution of solution B appearing unharmed.

EXAMPLE 8

2,2-dibromo-2-cyanacetamide was employed as a slimicide in a paper mill aqueous dispersion. The dispersion in use in such operations was found to have a pH of from 6.8 to 7.0 and a water temperature of from 96° F. to 109° F. having a flow rate of about 20 million gallons per day during the test period and carrying about 600 tons of pulp per day. The dispersion averaged about 4 percent stock containing about 80 percent virgin hard and soft wood fiber and 20 percent broke for use in making quality printing papers. Before and during such operations, inlet water was taken from a lake, and chlorinated slightly to provide less than one part per million and most frequently no detectable chlorine residues in the stock at the paper machine trays. Prior to the addition of the bromoacetamide compound the machine trays were observed to be quite dirty and slimy, containing microbial slime deposits and microorganisms counts in excess of 100,000,000 organisms per milliliter were observed. During the test period 2,2-dibromo-2-cyanoacetamide was added to the stock as a 20 percent solution in polyethyleneglycol 200 at two chests, at a broke washer and a broke pit. The compound was added in amounts sufficient to provide antimicrobial concentrations of from 0.7 to 1.4 parts per million per ton of pulp during the first month, and was thereafter added in an amount sufficient to provide a substantially continuous concentration of about 0.9 part of the bromocyanoacetamide compound per million parts by weight of ultimate dispersion per ton of pulp for a second month. Excellent results were obtained with organism counts from near sterility to 3,000,000 per milliliter being observed and counts of about 500,000 or fewer organisms per milliliter were frequently observed throughout the test period. Observations indicated destruction of existing slime deposits in the initial portions of the period and excellent control of slime formation continuing during the remainder of the test period. No detrimental effects on the paper making equipment were noted, and the quality of the paper produced was excellent. No undesirable color or odor was noted and no foaming difficulties attributable to the treatment were experienced.

EXAMPLE 9

Separate paper pulp slurries were prepared, each containing 0.7 percent bleached Kraft softwood pulp, beaten to give about 500 freeness. Radioactive carbon-14 labelled 2,2-dibromo-2-cyanoacetamide was added to separate slurries in antimicrobial amounts of 1, 5 and 10 parts by weight of said compound per million parts by weight of slurry. Pads of paper were made from aliquot portions of each slurry immediately after the addition of the radioactive 2,2-dibromo-2-cyanoacetamide by a procedure similar to typical paper mill procedure to provide paper samples weighing about 300 milligrams per square inch. A scintillation counter was employed to determine the amount of Carbon 14 in the pulp originally, in the slurry after addition of the bromocyanoacetamide compound, and in the paper prepared therefrom. In these operations, it was found that approximately 0.5 percent by weight of the 2,2-dibromo-2-cyanoacetamide remained in the paper at each concentration level tested and that the amount so remaining did not significantly increase after the 1.5 hour exposure time. The maximum amount of 2,2-dibromo-2-cyanoacetamide per square inch of paper was calculated to be about 0.27, 1.34 and 2.9 micrograms per square inch, respectively, for concentrations of compound in the pulp slurry of 1, 5 and 10 parts per million.

I claim:

1. A method useful for preserving an aqueous dispersion of biodegradable cellulosic matter from microbial attack by slime-forming microorganisms, the method comprising adding an antimicrobial amount of a bromocyanoacetamide compound to such an aqueous dispersion while said dispersion is contaminated with a mixed population of bacterial and fungal slime-forming microorganisms, said bromocyanoacetamide compound corresponding to the formula

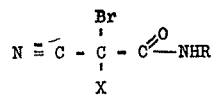

wherein X represents chlorine, bromine or hydrogen and R represents methyl or hydrogen; thereafter adding to the dispersion sufficient of a water soluble base to provide a pH of from about 8 to about 14 in the dispersion and holding the resulting dispersion after addition of the base for a period of time sufficient to provide a substantial reduction in antimicrobial activity in the dispersion.

2. The method of claim 1 wherein the pH of the aqueous dispersion is between about 4 and about 6.5, and the bromocyanoacetamide compound is added as the sole essential antimicrobial agent.

3. The method of claim 2, wherein the compound is 2,2-dibromo-2-cyanoacetamide, and the compound is added to the dispersion in an antimicrobial amount of from about 0.5 to about 10 parts by weight of said compound per million parts by weight of aqueous dispersion.

4. The method of claim 1 wherein the bromocyanoacetamide is 2,2-dibromo-2-cyanoacetamide and sufficient base is added to raise the pH of the dispersion to between about 8 and about 11.5, and the dispersion is held for a time sufficient to reduce the concentration of 2,2-dibromo-2-cyanoacetamide therein to a concentration of from zero to about 250 parts per billion.

5. The method of claim 1 wherein the pH of the dispersion is raised to between about 8 and about 9 and the dispersion is held at a temperature of from about 20° to about 45° C. for from about 30 minutes to about twelve hours.

6. In a method for protecting water subject to attack by a first microbial population wherein said water is subsequently exposed to a second population of desirable microorganisms, the method comprising adding to said water an antimicrobial amount of a bromocyanoacetamide compound corresponding to the formula

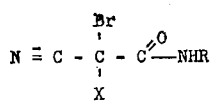

wherein X represents chlorine, bromine or hydrogen and R represents methyl or hydrogen, said water having a neutral to acid pH of from about 3.5 to about 7, the improvement which comprises:
  treating said water prior to exposure of the water to the second population of desirable microorganisms, said treating step comprising mixing the water containing the bromocyanoacetamide compound with sufficient of a water-soluble base to provide a pH therein of from about 8 to about 14, holding the resulting mixture for a time sufficient to provide less than an antimicrobial amount of the compound therein, whereby the water thus treated is rendered more safe for exposure to desirable microorganisms and discharge into the environment, and thereafter contacting said desirable microorganisms with the water thus treated.

7. The method of claim 6 wherein the compound is added to the water as the sole essential antimicrobial agent in an amount of from about 0.5 to about ten parts by weight of compound per million parts by weight of water, wherein sufficient base is added to provide a pH of from about 8 to about 10 therein, and wherein the water is then held for at least from about 15 minutes to about 20 hours.

8. The method of claim 7 wherein the water is paper mill stock having a pH of from about 4 to about 6.5.

9. The method of claim 7 wherein the base is selected from the group consisting of alkali metal hydroxides and ammonia.

10. A method useful for preserving aqueous dispersions of biodegradable cellulosic matter from microbial attack by slime-forming microorganisms, the method comprising adding to such an aqueous dispersion contaminated with slime-forming microorganisms an antimicrobial amount 2,2-dibromo-2-cyanoacetamide, the dispersion being substantially free of metallic mercury, water soluble sulfides, xanthates and thiosulfates thereafter adding to the resulting aqueous dispersion containing such antimicrobial amount of said compound an amount of a water soluble base sufficient to provide a pH of from about 8 to about 12 therein, thereafter holding the dispersion for a time sufficient to provide less than an antimicrobial amount of 2,2-dibromo-2-cyanoacetamide therein, and thereafter exposing a second population of microorganisms to the dispersion.

11. The method of claim 10 wherein the dispersion contains starch, sulfite ions and lignin.

12. The method of claim 10 wherein the 2,2-dibromo-2-cyanoacetamide is added in an amount of from about 0.5 to about 5 parts by weight of said compound per million parts by weight of an aqueous paper pulp dispersion having a pH of from about 4 to about 6.5.

13. The method of claim 12 further comprising the steps of thereafter adding to the resulting aqueous dispersion containing such antimicrobial amount of said compound an amount of a water soluble base sufficient to provide a pH of from about 8 to about 12 therein and thereafter holding the dispersion for a time sufficient to provide a concentration of from zero to about 250 parts by weight of 2,2-dibromo-2-cyanoacetamide per billion parts by weight of dispersion.

14. A method useful in the control of microorganisms for rendering an aqueous preparation containing an antimicrobial amount of a bromocyanoacetamide compound more safe for contact with a desirable population of living microorganisms, said bromocyanoacetamide compound corresponding to the formula

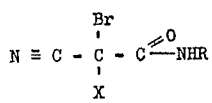

wherein X represents chlorine, bromine or hydrogen and R represents methyl or hydrogen; the method comprising adding sufficient water soluble base to said preparation to provide a pH of from about 8 to about 14 therein; thereafter holding said preparation for a time sufficient to provide less than an antimicrobial amount of the bromocyanoacetamide therein, whereby the resulting dispersion is rendered more safe for contact with living microorganisms; and thereafter contacting the preparation with a desirable population of living microorganisms.

15. The method of claim 14 wherein the preparation has a pH of from about 3.5 to about 7 and wherein the method further comprises the step of adding sufficient water soluble base thereto to provide a pH of from about 8 to about 11.5 therein prior to said holding step.

16. The method of claim 14 wherein the temperature of the preparation is between about 20° C. and about 45° C.

17. The method of claim 14 wherein the compound is a member of the group consisting of 2-bromo-2-cyanoacetamide, 2,2 - dibromo-2-cyanoacetamide, 2-bromo-2-chloro - 2 - cyanoacetamide and 2,2 - dibromo-2-cyano-N-methylacetamide.

18. The method of claim 17 wherein the preparation contains an antimicrobial amount of 2,2-dibromo-2-cyanoacetamide sufficient to prevent slime-formation by microorganisms and insufficient to sterilize the preparation and wherein the preparation is held at a pH of from about 8 to about 9.

19. The method of claim 18 wherein the preparation contains an antimicrobial concentration of between about 0.5 and 5 parts by weight of 2,2-dibromo-2-cyanoacetamide per million parts by weight of ultimate preparation, and wherein the preparation is held for from about 30 minutes to about 12 hours at a temperature of from about 20° C. to about 45° C.

References Cited

UNITED STATES PATENTS

| 2,419,888 | 4/1945 | Nolan et al. | 424—304 |
| 3,403,174 | 9/1968 | Chance et al. | 260—465.4 |
| 3,065,123 | 11/1962 | Hinton et. al. | 162—161 |

FOREIGN PATENTS

| 1,218,661 | 6/1966 | Germany. |
| 1,450,854 | 1/1966 | France. |

S. LEON BASHORE, Primary Examiner

F. FREI, Assistant Examiner

U.S. Cl. X.R.

106—15 AF; 424—304, 320